United States Patent [19]

Konesky

[11] Patent Number: 4,574,345
[45] Date of Patent: Mar. 4, 1986

[54] MULTIPROCESSOR COMPUTER SYSTEM UTILIZING A TAPPED DELAY LINE INSTRUCTION BUS

[75] Inventor: Gregory A. Konesky, Hampton Bays, N.Y.

[73] Assignee: Advanced Parallel Systems, Inc., Port Jefferson, N.Y.

[21] Appl. No.: 489,169

[22] Filed: Apr. 27, 1983

Related U.S. Application Data

[63] Continuation-in-part of Ser. No. 250,075, Apr. 1, 1981, abandoned.

[51] Int. Cl.[4] .................. G06F 15/04; G06F 15/20
[52] U.S. Cl. ................................................ 364/200
[58] Field of Search ............................ 364/200, 900

[56] References Cited

U.S. PATENT DOCUMENTS

| | | | |
|---|---|---|---|
| 3,473,160 | 10/1969 | Wahlstrom | 364/900 |
| 3,573,851 | 4/1971 | Watson et al. | 364/200 |
| 3,913,070 | 10/1975 | Malcolm et al. | 364/200 |
| 4,059,851 | 11/1977 | Nutter, Jr. | 364/200 |
| 4,392,200 | 7/1983 | Arulpragasm et al. | 364/200 |

Primary Examiner—Harvey E. Springborn
Attorney, Agent, or Firm—Mandeville & Schweitzer

[57] ABSTRACT

The disclosure is directed to a multiprocessor data processing system. The data processing system of the invention generally comprises a plurality of microprocessor units and an instruction memory device electrically storing a common set of instructions in a pre-ordered sequence, each of said instructions being stored in representative, digital, electrical signal form. A tapped delay line instruction bus system is provided to electrically interconnect the instruction memory with each of the microprocessor units. The tapped delay line instruction bus system includes a plurality of individual tap buses and electrical controls operable to apply the digital electrical signals for each of the instructions stored in the instruction memory device to each of the individual tap buses, one tap bus at a time, in a timed, time-skewed sequence. Each of the plurality of microprocessor units is electrically connected to one of the individual tap buses of the tapped delay line instruction bus system whereby each of the microprocessor units receives the representative electrical signals for each of the instructions stored in the instruction memory device pursuant to a pre-ordered, timed sequence.

13 Claims, 15 Drawing Figures

DATA BUS UTILIZATION

NOTE: A PARCEL MAY CONSIST OF INDIVIDUAL BITS, WORDS, CLUSTER OF WORDS, OR WHOLE PAGES OF DATA, DEPENDING ON THE APPLICATION

1. LOAD FIFO FROM DATA BUS

2. READING FIFO INTO MICROCOMPUTER

3. LOADING FIFO FROM MICROCOMPUTER

4. READING FIFO ONTO DATA BUS

5. MICROCOMPUTER DIRECTLY CONNECTED TO DATA BUS

MULTIPROCESSOR COMPUTER SYSTEM UTILIZING A TAPPED DELAY LINE INSTRUCTION BUS

RELATED APPLICATION

This application is a continuation-in-part of application Ser. No. 250,075, filed Apr. 1, 1981, now abandoned.

BACKGROUND AND SUMMARY OF THE INVENTION

The present invention is directed to a multiprocessor data processing system. More particularly, the present invention provides a new and improved digital computer system generally comprising a plurality of identical processors each of which is connected to a common data bus and a specific tap of a tapped delay line instruction bus. The novel arrangement for a multiprocessor data processing system disclosed herein is operable to achieve highly overlap operation of the plurality of identical processors whereby the system may be arranged to include a large number (i.e., hundreds to thousands) of processors with no interprocessor competition for the system resources. The present invention has significant practical applications in areas of data processing wherein an identical series of processing steps must be performed on a very large amount of input data.

Throughout the entire development of electronic computer systems, those skilled in the art have continuously sought to develop computer machines having high data throughput rates to achieve a throughput speed-up in applications wherein a fixed set of instructions is applied to a large data base, in a repetitious fashion. An early prior art design is embodied in the so-called "Von Neumann" computer. A traditional Von Neumann computer utilizes a single, central processing unit (CPU) wherein both the program instructions and data flow to and from the single CPU from a single memory device. A problem associated with such Von Neumann computers is that the ultimate throughput rate achievable in such systems is limited by the memory bandwidth of the single memory device. Even the utilization of expensive, state of the art, high speed memory devices achieves a relatively small improvement in the throughput rate in that such high speed implementation technology generally involves a considerable and disproportionate increase in the overall cost of the system. The above-discussed practical limitations imposed by implementation technology and the cost thereof have resulted in commercially feasible Von Neumann computer systems capable of performing only a few Millions of Instructions Per Second (MIPS), at best.

Significant advances in the data processing art have been achieved pursuant to many prior art proposals including the separation of the instruction stream and the data stream into two physically distinct buses as well as the utilization of a large plurality of storage registers in the CPU to receive and temporarily store information to be processed by the CPU. These proposals, when coupled with advances made in solid state technology, i.e., low cost, high density integrated circuits, led to the multicomputer concept to achieve high data throughput rates. In a multicomputer system, a plurality of separate and independent processing elements are arranged whereby the processing power of the system is distributed across the several independent processing elements. In this manner, a given problem is divided among the several processing elements to achieve a throughput rate speed-up that is a function of the composite throughput rates of the several elements. Thus, the more processors employed, the greater the speed-up in the throughput rate of the system. In an ideal system, the throughput rate speed-up will be a near linear speed-up with increasing numbers of processors.

In well known prior art multicomputer systems (e.g., ILLIAC-IV, PEPE and Holland Machines), the several processing elements are arranged to be operable simultaneously. As implemented in commercial embodiments, these prior systems have encountered practical limitations in their throughput rates due to interprocessor and processor to memory conflicts. Accordingly, the number of processors which may be utilized at any one time to apply a series of instructions to a large data base is limited by the capabilities of the processor interconnect systems utilized in the system to control and co-ordinate processing operations. While sophisticated and complex processor interconnect systems have been developed to minimize interprocessor and processor to memory conflicts, the costs of these advanced interconnect systems is considerable particularly when viewed in relation to the number of additional processing elements addable to the system by virtue of the implementation of such advanced interconnect systems.

It is a primary objective of the present invention to provide a new and improved multiprocessor system including features designed to maximize the throughput rate without encountering the excessive costs and other practical limitations associated with the prior art proposals. Generally, the present invention provides a multicomputer architecture which permits substantially independent operation of each of the processing elements while accommodating the flow of instructions and data through the system without any interprocessor conflicts. This is achieved pursuant to a significant feature of the invention whereby each of the processing elements comprises a microcomputer arranged to be connected to a specific tap of a tapped delay line. The tapped delay line includes an input instruction bus interconnecting the tapped delay line with an instruction memory. The specific set of instructions to be applied by each of the microcomputers to the data is stored in the instruction memory.

As will be described in greater detail below, the instructions contained in the stored set of instructions are applied in a timed sequence, one at a time, from the instruction memory to the tapped delay line. The several taps of the tapped delay line are in a time skewed relation to one another such that each instruction applied to the tapped delay line will appear on one tap at a time and progress from tap to tap under the control of a clock associated with the tapped delay line. The same clock or a second synchronized time control is used to control the timed sequential application of the instructions from the instruction memory to the tapped delay line. Thus, when instruction one is applied to the tapped delay line, it will appear on the first tap interconnecting the first microcomputer to the tapped delay line. When the clock applies its next control signal, instruction two will be applied to the tapped delay line and appear at the first tap while instruction one is simultaneously transmitted to the second tap of the tapped delay line. The second tap is arranged to interconnect the second microcomputer to the tapped delay line. In this manner, the entire set of instructions stored in the instruction memory is sequentially applied to all the microcomputers of the system on a time-skewed basis. When the $n^{th}$ instruction is applied to the tapped delay line, the first instruction will have arrived at the $n^{th}$ tap. Accordingly, the entire set of common instructions to be applied by each of the microcomputers to its particular data parcel is effectively and orderly transmitted from the instruction memory to each and every one of the plurality of microcomputers without any conflict between the individual processors or between any of the processors and the system resources.

Pursuant to another feature of the invention, each of the microcomputers is also connected to a common data bus. The common data bus provides a means of communication between the several microcomputers and a common data memory. In accordance with the invention, the data to be processed is segmented into several data parcels with each parcel containing the entire number of data points to be processed by a particular microcomputer pursuant to the common set of instructions. The system of the invention includes appropriate control means to coordinate the operation of the instruction memory with the operation of the data memory whereby the data memory will present the parcel of data for each particular microcomputer to the common data bus when the instruction to take data from the data bus is being executed by the particular microcomputer. For example, if the first instruction concerns taking data from the data bus, the data parcel for the first microcomputer will be placed on the data bus when the first instruction is being executed by the first microcomputer and so on until the $n^{th}$ parcel of data is placed on the data bus when the first instruction is being executed by the $n^{th}$ microcomputer.

In the event the common set of instructions results in a parcel of output data from each of the microcomputers, the common data bus may also be used to transmit the output data parcels from each of the microcomputers to a system output device. The coordinated utilization of the common data bus to transmit output data parcels will be similar to the input data parcel approach described above.

Thus, the present invention provides a straightforward and highly effective architecture for a multiprocessor data processing system. The flows of data and instructions are controlled and coordinated to achieve a maximum throughput rate for the system with minimal interference between the several microprocessors. Indeed, the throughput rate speed-up factor of the present invention is substantially linear with the speed-up factor approximately equaling the ideal of the product of the number of processors in the system times the processing rate of each microprocessor (measured in Millions of Instructions Per Second). This is particularly true when the total number of data points is large, e.g., 1,000,000 data points. The system of the invention has significant utility in application environments wherein a large array of input data points must be processed pursuant to the common set of instructions to produce an array of output data points. Suitable applications for the present invention exist in the fastest growing areas of technology, such as graphics and image processing, quality control testing and computer-aided design systems. As will be discussed in the following detailed description of preferred embodiments of the invention, the basic principles of the present invention may be applied to achieve optimal throughput rates in highly economically feasible hardware and software systems. Such embodiments of the invention are compatable with existing computer technology and "real" world interfaces for convenient implementation to upgrade an overall system's effectiveness and speed of operation.

Moreover, the present invention contemplates several configurations for the several processors as well as enhancement features for each of the processors to further improve the throughput rate speed-up capability of the system. The multiple processor configurations include either linear or parallel chain arrangements or a shared chain arrangement whereby two separate sets of instructions may be applied to data by "sharing" the several processors of one linear array between two instruction memory-tapped delay line arrangements. These various configurations are further enhanced, where appropriate, by data buffers and double buffered instruction interconnections between each of the microcomputers and the common data bus and tapped delay line. In this manner, each of the microcomputers may temporarily store data and/or several steps of instructions at one time to increase the flexibility of operation of each unit without interfering with the system's common resources.

Furthermore, paired microcomputers may be utilized for each of the data processors whereby each of the pair processes the same data parcel and the outputs of the pair are compared to verify accuracy. Such an arrangement lends itself to a fault tolerant embodiment of the invention wherein the detection of faulty operation in any of the processing means by a mismatch between the outputs of the paired microcomputers will activate a control signal to remove the faulty processor pair from the chain and transfer the data parcel earmarked for that particular processing unit to another properly functioning unit.

To advantage, a physical embodiment of the present invention may be assembled from commercially available subcomponents in a manner whereby the system is dynamically reconfigurable and adaptive to accommodate changes in the number and configuration of microcomputers employed. Accordingly, the operation of the system may be conveniently modified to obtain optimum results for the number of data points and instructions involved in a particular practical application.

For a better understanding of the above and other features and advantages of the invention, reference should be made to the following detailed description of preferred embodiments of the invention and to the accompanying drawings.

DETAILED DESCRIPTION OF PREFERRED EMBODIMENTS OF THE INVENTION

Figure 1:
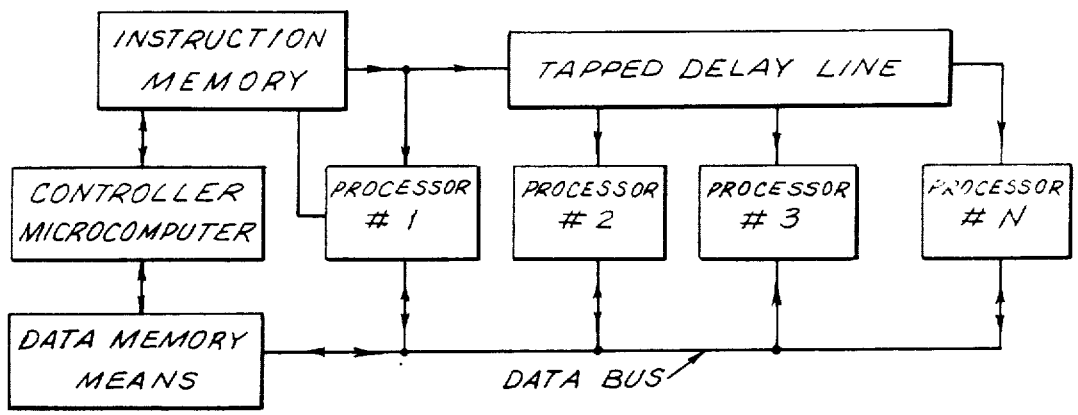
FIG. 1 is an illustration in block diagram form of a multiprocessor system incorporating the present invention.

Referring now to the drawings and initially to FIG. 1 thereof, there is illustrated a preferred simple linear chain embodiment of the multiprocessor system according to the invention. A number, n, of identical microprocessors 10 are arranged in a linear array. Each of the microprocessors 10 comprises a microcomputer which is operable independently of the remaining microprocessors 10 to apply a set of instructions to a predetermined parcel of data to obtain a desired result. The system also includes an instruction memory 11 to store the set of instructions to be implemented by each of the microprocessors 10 and a data memory means 12 to store the various parcels of data to be processed by the n microprocessors 10. A common data bus 13 is arranged to interconnect the data memory means 12 with each of the microprocessors 10. To that end, a tap bus 14 is associated with each of the microprocessors 10 to provide a means of data flow between the common data bus 13 and input/output terminals of the particular microprocessor 10.

Pursuant to an important feature of the invention, a tapped delay line 15, including several time delayed tap lines 16, 17, 18, forms a means for sequentially transmitting to the microprocessors 10, one at a time, on a time-skewed basis, the several instructions stored in the instruction memory 11. In the preferred embodiment, the first microprocessor 10 includes the memory address of each of the instructions. The addresses are fed to the instruction memory via bus 19 which interconnects the first microprocessor 10 with the instruction memory 11. In this manner, the specific instructions may be accessed from the instruction memory 11 in a proper timed sequence and applied to an instruction bus 20. The instruction bus 20 applies the instruction words accessed by the first microprocessor 10 to the first microprocessor 10, via instruction bus 21 and to the tapped delay line 15. As indicated above, the several instructions proceed one at a time, from tap to tap of the tapped delay line 15 to the remaining microprocessors 10 on a time-skewed basis. Thus, the first instruction does not appear on the tap 16 until after the first instruction is executed by the first microprocessor 10 and when the first microprocessor 10 accesses the second instruction from the instruction memory 11. The second instruction will appear on the tap 16 and the first instruction will appear on the tap 17 when the first microprocessor 10 accesses the third instruction from the instruction memory 11. This will continue for a predetermined number of instruction execution time cycles until all of the instructions have been received by all of the microprocessors 10, as will appear.

Figure 2:
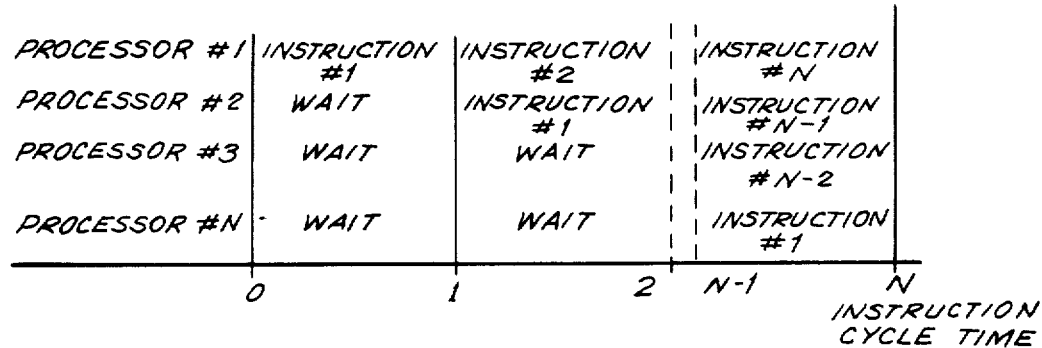
FIG. 2 is a chart illustrating the instruction execution sequence of each of the processors of a multiprocessor system in relation to the other processors of the system over a period of time.

Referring now to FIG. 2, it can be seen that the instruction execution sequence obtained by utilizing the tapped delay line 15 is such that with each instruction time cycle, the instructions ripple down the specific taps 16, 17, 18 of the tapped delay line 15 whereby the first instruction reaches the tap 18 interconnecting the tapped delay line 15 with the $n^{th}$ microprocessor 10 during the $N-1$ instruction time cycle. Each of the microprocessors 10 waits a number of instruction time cycles equal to its number in the linear array minus one to receive the first instruction. Thereafter, the particular microprocessor 10 receives the remaining instructions through its tap, one per instruction time cycle. Thus, the entire set of common instructions to be implemented by each of the microprocessors 10 is presented to the microprocessors 10 without any interference between the microprocessors 10 or between any of the microprocessors 10 and other components of the system. Of course, the length of the instruction time cycle is set to be compatible with the throughput rate of the several identical microprocessors 10 so that the flow of instruction words to the microprocessors 10 is synchronized with the instruction execution speed of the microprocessors 10.

Figure 3:
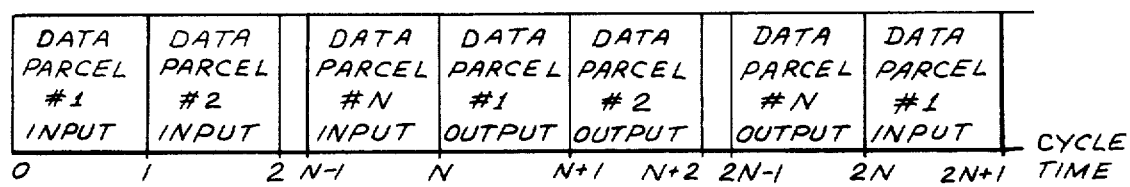
FIG. 3 is a chart illustrating the utilization of the common data bus of the system illustrated in FIG. 1 to transmit input and output data parcels over a period of time.

In accordance with the invention, the instruction execution sequence provided by the tapped delay line 15 is coordinated with the data flow on the common data bus 13 so that each of the individual microprocessors 10 may apply the set of instructions inputed thereto to a specified parcel of data. As illustrated in the chart of FIG. 3, the common data bus 13 is utilized on a cycle time basis with each time cycle of the data bus being synchronized to the instruction time cycles of the tapped delay line 15. To that end, a controller microcomputer 22 is programmed to organize the data into data parcels and apply the data parcels to the common data bus 13, as described.

For purposes of illustration, it will be assumed that the first instruction of the set of common instructions is a read data command. Thus, during the first instruction execution cycle, when the first instruction is inputed to and executed by the first microprocessor 10 (see FIG. 2), the data parcel input for the first microprocessor 10 will be placed on the common data bus 13 (cycle time $0-1$ of FIG. 3) by operation of the controller microcomputer 22. As the first instruction ripples down the taps 16, 17, 18 of the tapped delay line 15, the various, specified parcels of input data for each particular microprocessor 10 is placed on the data bus 13 until the $N-1$ time cycle when the data parcel for the $n^{th}$ microprocessor 10 is placed on the data bus 13.

After n instruction execution cycles, assuming the number of processors is not greater than the number of instructions, the common data bus 13 will be free to be accessed by each of the microprocessors 10 sequentially, one at a time, for n time cycles, whereby the data generated by the microprocessors 10 may be outputed to the memory means 12 (see time cycles n to 2n on the chart of FIG. 3). Thereafter, beginning at time cycle 2n, a new series of data parcels may be transmitted through the common data bus 13 in the same manner as the first series and so on. Thus, the several microprocessors 10 may be used repetitively to process a great amount of data pursuant to a common set of instructions. The overall throughput rate for the system may be increased by subdividing the common data bus 13 into independent input and output half words so that the stream of input data parcels may be continuous on the input portion of the data bus 13 with output data parcels being simultaneously transferred to the memory means 12 on the output portion of the common data bus 13 (of course, i.e., starting from time cycle n). The subdivided data bus arrangement eliminates the need for the microprocessors 10 to wait n time cycles between data output execution and a new data parcel input. In addition, data flow speed may be further enhanced by utilizing a first-in-first-out (FIFO) data buffer between each of the microprocessors 10 and the common data bus 13. The subdivided data bus and FIFO data buffer modifications to the basic, simple, linear chain embodiment of the invention will be described in greater detail below.

As should be understood, the intended practical applications for the invention will generally involve the application of a processing algorithm (as set forth in the common set of instructions) to a large array of data points. The algorithm operates on a single data point or a local cluster of data points, i.e., the specified data parcels, to produce an array of useful output data points, i.e., the output data parcels, (see FIG. 3). The relationship between the number of instructions to be executed by each of the microprocessors 10 and the number of times each of the microprocessors 10 must access the common data bus 13 for input data parcels places a fundamental limitation on the maximum number of microprocessors 10 which may be linked in the linear array illustrated in FIG. 1. Implicit in this fundamental limitation is the practical limitation that there be at least as many data points as the total number of microprocessors 10 in the linear array. More specifically, the number of processors must be less than or equal to the number of instructions between, and including, successive memory accesses. This is due to the fact that although the microprocessors 10 are generally operable independently and simultaneously, they may not simultaneously execute an instruction requiring the microprocessor to read the common data bus 13. If more than one microprocessor were to read the common data bus 13 at one time, the several microprocessors reading the data bus would read the same data parcel and duplicate the processing operation. The time-skewed effect of the tapped delay line 15 and coordinated data flow on the common data bus 13, as illustrated in FIGS. 2 and 3, inherently avoid this situation so long as the total number of microprocessors 10 is kept at or below the above-described number relative to the number of instructions between memory accesses. The generalized rule concerning the maximum number of microprocessors 10 assumes that the common data bus 13 is subdivided into independent input and output data flows, as will be more fully described.

Given the limitation on the maximum number of processors set forth above, the data throughput rate speedup obtainable on the system of the invention, as illustrated in FIG. 1, will now be discussed. For purposes of illustration, we assume that the input data array of a practical application of the invention contains N data parcels. Therefore, N processing operations must be performed by the system of FIG. 1. Moreover, it is assumed that the common set of instructions consists of L instructions including the common data bus 13 memory access instructions. Accordingly, to fully process all N data parcels, the entire array of microprocessors 10 must perform L times N instruction executions. If a single data processing unit were utilized and the single unit had a processing rate R, measured in Millions of Instructions Per Second (hereinafter MIPS), then the total execution time for the processing of the N data parcels would be equal to LN/R.

In accordance with the primary objective of the invention, the total execution time or processing the N data parcels is shortened considerably by distributing the data processing operations among the several microprocessors 10 whereby each of the microprocessors 10 processes a certain portion of the total input data substantially simultaneously with the remaining microprocessors 10. In a multiprocessor system, the number of instructions to be executed by any one microprocessor is equal to the total number of instruction executions divided by the number, Np, of microprocessors, i.e., LN/Np. In the system of the invention, the microprocessors 10 operate simultaneously, as indicated, but not exactly simultaneously with respect to the particular instruction being executed at any particular time cycle. The microprocessors 10 do not operate exactly simultaneously in executing a particular instruction due to the time-skewed instruction delivery provided by the tapped delay line 15. As indicated in FIG. 2, there is an amount of time equal to $(Np-1)$ time cycles during which the first instruction ripples down the tapped delay line 15. Accordingly, an additional $Np-1$ time cycles must be included in any data throughput rate speed up calculation for the system of invention to allow for the delayed operation of the last microprocessor 10. With this in mind, it may be stated that the total execution time for the system of FIG. 1 is equal to $((LN/NP)+(Np-1))/R$ (R is the processing rate of each of the identical microprocessors 10). The throughput rate for the system, T, (measured in MIPS) may therefore be calculated, as follows:

$$T = LN/(((LN/Np)+(Np-1))/R)$$

Rearranging this equation, T may be stated as follows:

$$T = NpR/1 + ((Np^2 - Np)/LN)).$$

Typical applications for the system of FIG. 1 involve $10^5$ to $10^9$ data points (N) and a minimum of 50 instructions (L) in the common set of instructions stored in the instruction memory 11. Therefore, the product LN is quite large as compared to each of Np and $Np^2$ even when there are several hundred microprocessors in the linear chain. The factor of $(Np^2-Np)/LN$ of the throughput rate equation is thus generally much smaller than 1 in value and the factor $1+(Np^2-Np)/LN$ of the above throughput rate equation approximately equals 1. Accordingly, the throughput rate of the system of FIG. 1 approaches the ideal of the product NpR. If each of the microprocessors 10 has a throughput rate of 0.25 MIPS and there are 100 microprocessors (i.e., Np=100) in the linear chain, the ideal system would have a composite throughput rate of 25 MIPS. In the system of the invention, as calculated using the above throughput rate equation, the composite throughput rate of a 100 microprocessor embodiment in an application involving 100 instuctions and a total of $10^6$ data points (i.e., L=100 and N=1,000,000) is 24.9975 MIPS. The composite throughput rate improves even further to 24.99975 MIPS if the number of instructions to be performed by each of the microprocessors 10 is increased to 1000. Practical applications wherein the teachings of the present invention may be utilized to achieve nearly ideal composite throughput rates include graphics and image processing, computer-aided design systems, data base operations and quality control systems.

Figure 6:
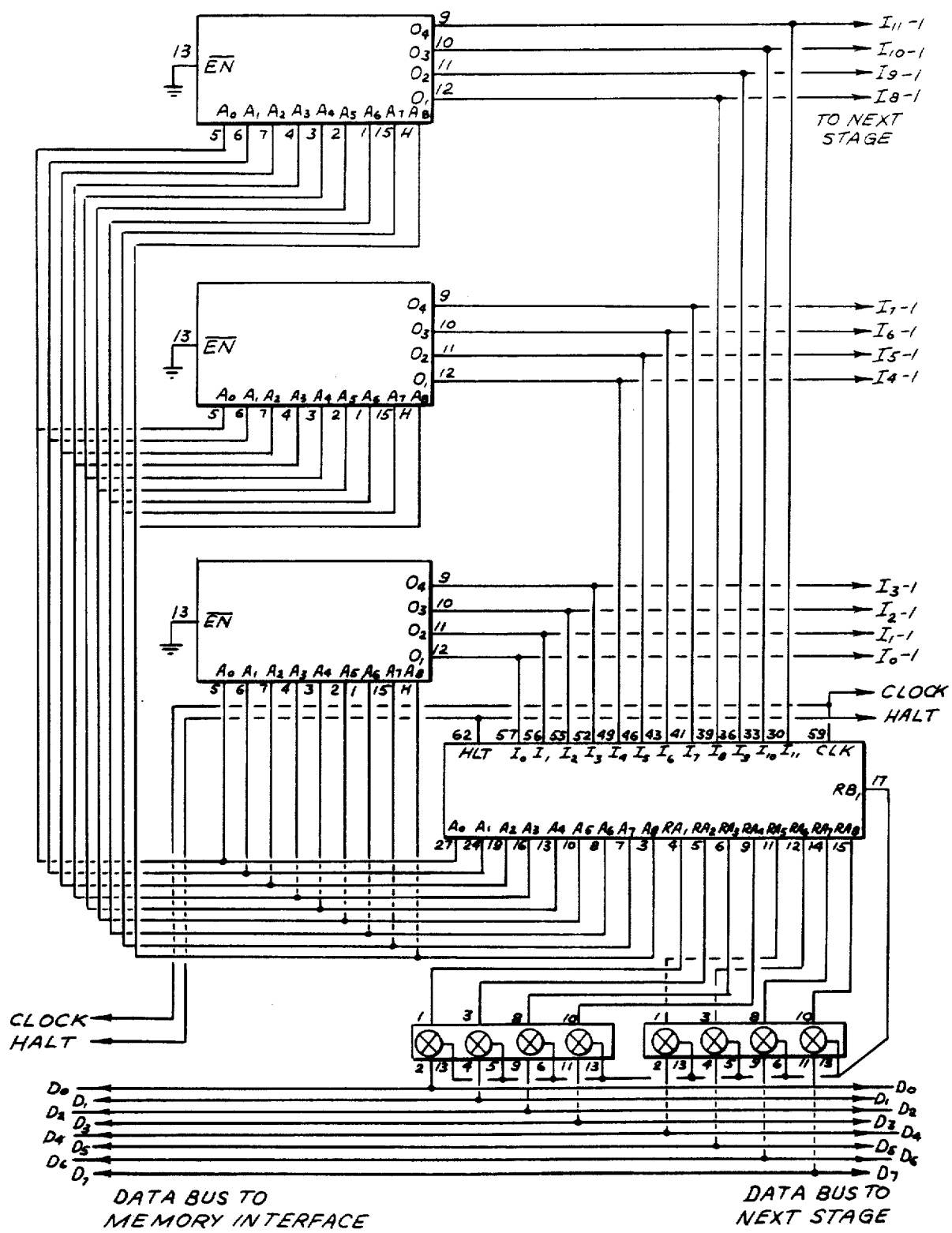
FIGS. 6 and 6A, when taken together, illustrate in schematic form a wiring diagram for a preferred form of the multiprocessor system of the present invention as illustrated in FIG. 1.
Figure 6A:
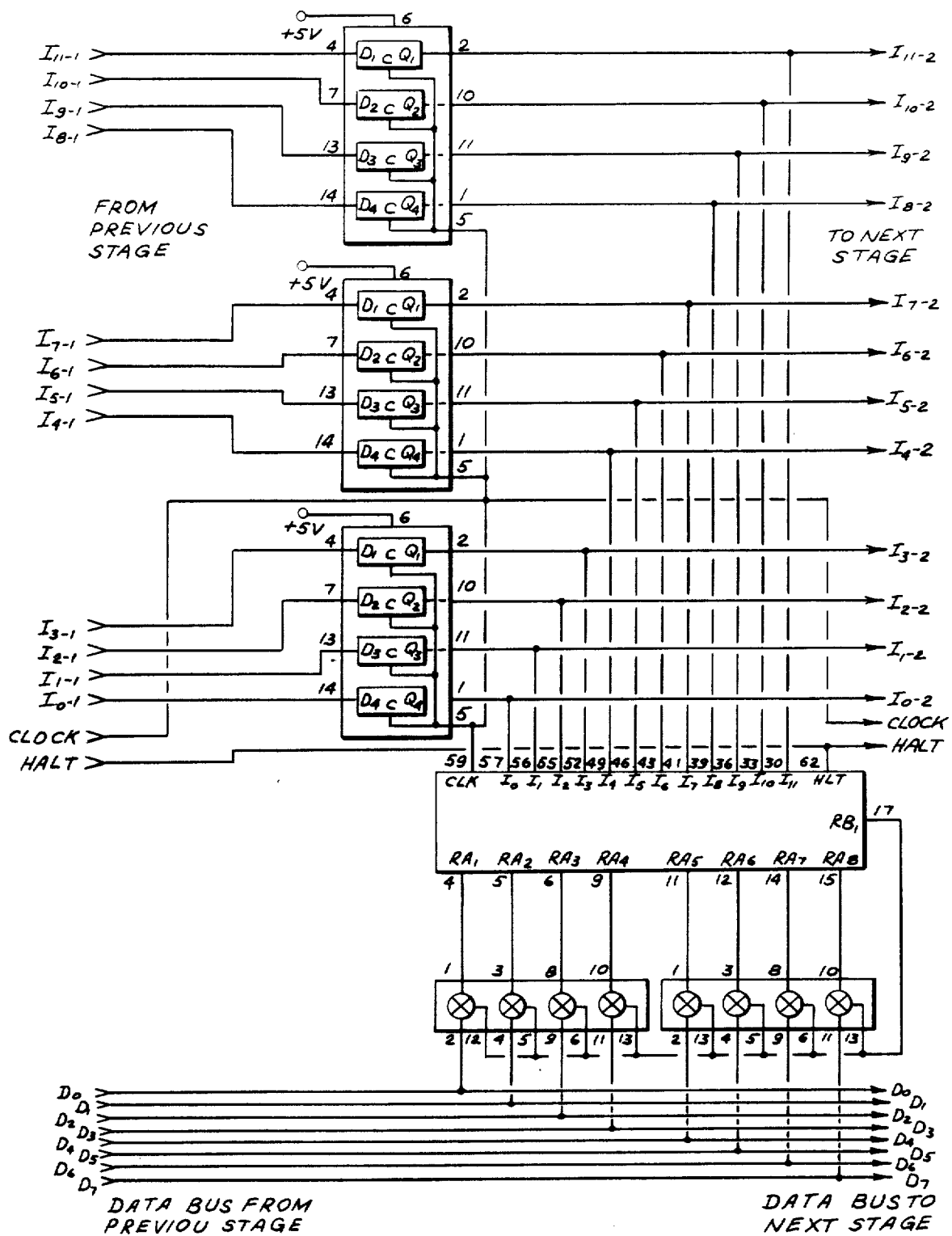

Referring now to FIGS. 6 and 6A, there is illustrated in schematic form, a wiring diagram for the first two stages of the linear chain embodiment of the invention according to FIG. 1. As should be understood, each stage includes a microprocessor 100, 101. To advantage, each of the microprocessors 100, 101 may comprise a commercially available microprocessor component. It has been found that the PIC 1665 microprocessor, manufactured by General Instrument Corp., has operating characteristics which are suitable for implementation in the time-skewed system of the invention.

A series of output pins $A_0$-$A_7$ of the first microprocessor 100 are connected, via an eight line bus 102 to corresponding pins $A_0$-$A_7$ of three programmable, read only memory devices (PROMs) 103-105. Each of the PROMs 103-105 comprises a commercially available model 74571 PROM, manufactured by National Semiconductor. The three PROMs 103-105 together are utilized as the instruction memory means for the set of instructions to be implemented by each of the microprocessors of the linear chain. The contents of each instruction may be divided among the three PROMs 103-105 such that each of the PROMs 103-105 stores a portion of each instruction.

To advantage, the first microprocessor 100 is programmed to store in its memory the address in the PROMs 103-105 of each of the instructions stored therein and to sequentially access the instructions one at a time from the PROMs 103-105 by transmitting the adresses one at a time over the bus 102 to the PROMs 103-105. To that end, a clock line 109 is arranged to provide a timed control signal to the microprocessor 100 whereby microprocessor 100 fetches the instructions in accordance with the timed instruction execution cycle of FIG. 2. The clock line 109 is connected to a standard 10 MHZ square-wave source (not specifically illustrated) in a conventional, well known manner. An additional line 110 connects the pin $A_8$ of the microprocessor 100 to corresponding pins $A_8$ of the three PROMs 103-105 to provide a flag control line. In this manner, the microprocessor 100 may properly control the PROMs to receive the instruction addresses pursuant to the clock line 109 time control and to immediately access the proper instruction stored at each particular address.

Each of the PROMs 103-105 will apply the instructions accessed therefrom, sequentially, one at a time, under the time control of the microprocessor 100 to its output pins $O_1$-$O_4$. The output pins $O_1$-$O_4$ of the PROMs 103-105 are connected to corresponding instruction buses 106-108. The instruction bus 106 consists of the lines designated $I_{0-1}$ to $I_{3-1}$. The instruction bus 107 consists of the lines $I_{4-1}$ to $I_{7-1}$. And, finally, the instruction bus 108 consists of the lines designated $I_{8-1}$ to $I_{11-1}$. An I/O port of the microprocessor, consisting of pins $I_0$ to $I_{11}$, is interconnected with the instruction buses 106 to 107 by suitable tap lines $I_{0-1'}$ to $I_{11-1'}$ connecting each of the pins $I_0$-$I_{11}$ to the complementary lines $I_{0-1}$-$I_{11-1}$ of the instruction buses 106-108. In this manner, the sequence of instructions appearing at the output pines $O_1$ to $O_4$ of the PROMs 103-105 by virtue of the operation of the clock line 109, and the control flag line 110 as well as the address information provided on bus 102, will be properly inputed to the microprocessor 100 for execution.

Pursuant to the invention, the lines $I_{0-1}$-$I_{11-1}$ of the instruction buses 106-107 are also connected to three sets of input pins $D_1$-$D_4$ of three Quad D flip/flop devices 111-113, as illustrated in FIG. 6A. To advantage, each of the Quad D flip/flop devices 111-113 may comprise a commercially available model 4042 Quad D flip/flop, manufactured by National Semiconductor. Each of the D flip/flops of each of the Quad D flip/flop devices 111-113 includes a clock control terminal suitably wired to the clock line 109 such that the instructions appearing at the input pins $D_1$-$D_4$ of the Quad flip/flop devices 111-113 will not appear at the output pins $Q_1$-$Q_4$ of the devices 111-113 until a timed pulse is transmitted along the clock line 9.

As should be understood, the same time control line 109 also controls the operation of the first microprocessor 100 whereby the timed pulse that causes the instruction on buses 106-108 to appear at output pins $Q_1$-$Q_4$ of the flip/flop devices 111-113 will also cause the first microprocessor, through the flag control line 110 and bus 102 to access the next instruction which will immediately appear on the buses 106-108. Thus, the instruction which appears on the output pins $Q_1$-$Q_4$ of the devices 111-113 will always be one instruction behind the instruction appearing on the buses 106-108.

Accordingly, there will be a time-skewed execution of the instructions as between the first microprocessor 100, the second microprocessor 101 and so on. To that end, the output pins $Q_1$-$Q_4$ of the devices 111-113 are connected to the buses 114-116. The bus 114 consists of lines designated $I_{0-2}$ to $I_{3-2}$. The bus 115 consists of lines designated $I_{4-2}$ to $I_{7-2}$. And, similarly, the bus 116 consists of lines designated $I_{8-2}$ to $I_{11-2}$. The lines $I_{0-2}$-$I_{11-2}$ are interconnected by tap lines $I_{0-2'}$ to $I_{11-2'}$ with corresponding pins $I_0$-$I_{11}$ of an I/O port of the second microprocessor 101 such that the time delayed instruction appearing on the buses 114-116 may be inputted to and executed by the second microprocessor. In addition, the clock line 109 is connected to a clock terminal of the microprocessor 101 to synchronize and coordinate its operation with the remaining components of the system. The lines $I_{0-2}$ to $I_{11-2}$ of the buses 114-115 may also be connected to the input terminals of a second set of Quad D flip/flops (not illustrated) which in turn may be connected by suitable buses and tap lines to a third microprocessor (not illustrated) in substantially the same manner as illustrated in FIG. 6A and so on to construct a linear chain of n microprocessors, as illustrated in block diagram form in FIG. 1. As should be understood, the D flip/flops, and associated buses and tap lines, form the tapped delay line component of the system of FIG. 1.

In accordance with another feature of the invention, a common data bus 117 is provided to transmit and receive input and output data to and from the microprocessors 100, 101. The common data bus 117 consists of eight lines designated $D_0$ and $D_7$. As will be described in more detail, the lines $D_0$ to $D_7$ are divided into input data lines $D_0$ to $D_3$ and output data lines $D_4$ to $D_7$. The pins designated $RA_1$-$RA_4$ of an I/O port of each of the microprocessors 100, 101 are connected to the input data lines $D_0$–$D_3$ by associated quad transmission gates 118, 119. Likewise, the pins designated $RA_5$–$RA_9$ of the same I/O port of each of the microprocessors 100, 101 are connected to the output data lines $D_4$–$D_7$ by two additional quad transmission gates 120, 121.

Each of the quad transmission gates 118–121 may comprise a CMOS 4016 quad transmission gate, manufactured by National Semiconductor. All of the gates of the quad transmission gates 118–121 are in a normally open state whereby the microprocessors 100, 101 are ordinarily isolated from the lines $D_0$–$D_7$ of the common data bus 117. A control line 122, 123 extends between a pin $RB_1$ of each of the microprocessors 100, 101 and each of the gates of the quad transmission gates 118–121. Accordingly, either a read data line instruction or an output data to the data line instruction may be executed by any one particular microprocessor by having the appropriate control line 122, 123 close the quad transmission gates associated with the particular microprocessor to thereby connect the microprocessor to the common data bus 117 for execution of the instruction.

The common data bus 117 is connected to the memory means of the system. The specific details of the memory means are not critical to the present invention and therefore, any suitable memory means may be utilized as required by the application to which the system is to be applied. However, pursuant to the teachings of the present invention, the memory means must be operated in a manner that is coordinated with the memory access instruction sequence of the set of instructions stored in the PROMs 103–105 such that the instruction execution sequence and data input flows are synchronized as illustrated in FIGS. 2 and 3. Moreover, the data must be stored in the memory means in discrete input data parcels with each data parcel containing all of the data points to be processed at one time by a particular microprocessor of the chain. As thus described, the data memory means will operate to place the data for a particular microprocessor 100, 101 on the input data lines $D_0$–$D_3$ of the common data bus 117 when a read data bus instruction causes the control line 122, 123 to close the quad transmission gates 118, 119 associated with the microprocessor executing the read instruction. The data may be organized and placed on the common data bus 117 by a data memory interface means comprising a memory-dedicated processor. The memory-dedicated processor is programmed to provide the synchronized data parcel flow on the common data bus 117 as required by the time-skewed instruction flow of the invention.

As discussed above in the description of the general principles of the system of the invention, the number of processors which are to be linked in a linear chain will not exceed the number of instructions between memory accesses. Inasmuch as the microprocessors 100, 101 are time-skewed relative to one another in executing any one particular instruction, there will not be any conflict between any microprocessors for access to the common data bus 117 to read input data. The same will be true with respect to placing output data on the output data lines $D_4$–$D_7$. Moreover, dividing the data bus 117 into separate input and output data streams permits continuous, simultaneous flows of input and output data without any delays in processor operations.

Thus, the schematic diagram of FIGS. 6 and 6A provides a straightforward, practical arrangement of commercially available components which is operable pursuant to the teachings of the present invention. The components may be readily obtained from the above-noted manufacturers or from many other reputable manufacturers. The D flip/flop devices of the instruction bus means operate to provide a time-skewed flow of the instructions from processor to processor, while the transmission gates under the control of each processor permit data bus access as an inherently coordinated function of the time-skewed instruction execution sequence. The system of FIGS. 6 and 6A is highly flexible in that any suitable software may be developed as required by the particular application to which the system is to be applied. The PIC 1665 microprocessor used in the system is an extremely fast and versatile component. A linear array of such components in accordance with the invention is capable of implementing a vast array of software programs as stored in the PROMs 103–105 and accessed for time-skewed execution by the instruction access programs of the first microprocessor and the D flip/flop devices, instruction bus arrangement.

Figure 4:
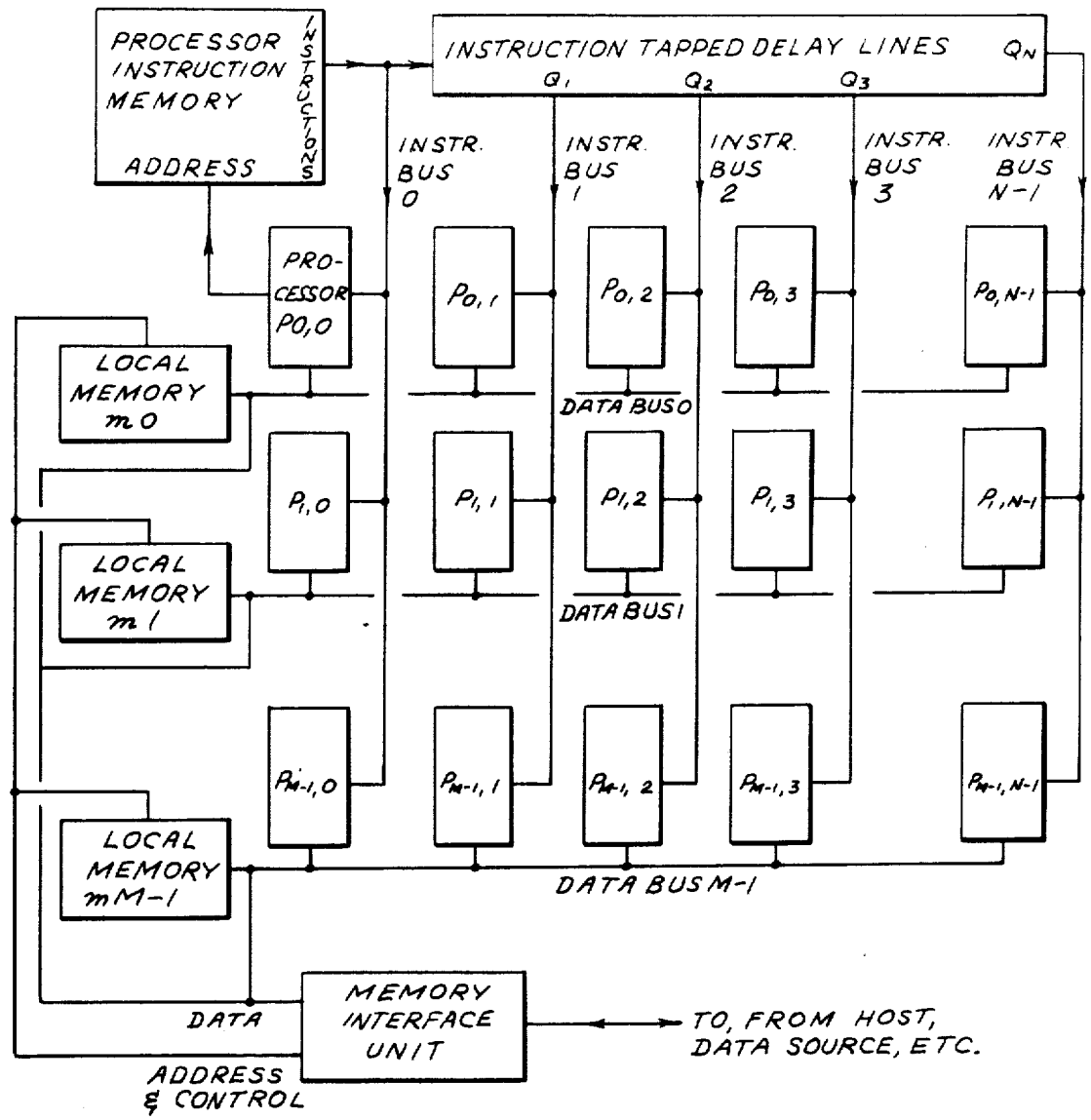
FIG. 4 is an illustration in block diagram form of another embodiment of the present invention including a linear, parallel configuration for the several processors of the system.

Referring now to FIG. 4, there is illustrated a modification of the basic linear chain embodiment of the invention wherein several independent linear chains are arranged in a parallel relation to one another. The parallel configuration for the several linear chains of microprocessors will achieve a throughput speed-up by a factor equal to the number of linear chains in the parallel configuration. The parallel configuration embodiment of the invention is suitable for practical applications wherein the total number of data points in the data memory may be subdivided into several local data memories with each of said local memories being assigned to a particular linear chain of the parallel configuration. As illustrated in FIG. 4, all of the processors in a given linear chain (e.g., processors $P_{0,0}$ to $P_{0,N-1}$) are connected to a common data bus (e.g., data bus 0) which interconnects all of the processors of that particular linear chain to one of the local memories (e.g., local memory m0). Moreover, inasmuch as each of the individual microprocessors of the configuration must execute the same set of instructions stored in the processor instruction memory, each processor of a particular column (e.g., processors $P_{0,0}$ to $P_{M-1,0}$) will be connected to a common tap (e.g., instruction bus 1 interconnecting tap $Q_1$ of the instruction tapped delay line to the processors $P_{0,1}$ to $P_{M-1,1}$ of the particular column). The first processor of the first linear chain $P_{0,0}$, the processor instruction memory, the instruction tapped delay line, the local memories m0 to mM−1, as well as the common data buses, data bus 0 to data bus M−1 are each constructed and operable in the manner discussed above with respect to the descriptions of the comparable components of FIGS. 1, 6 and 6A. The particular data parcels stored in each of the local memories as well as the coordinated control of each of the local memories is facilitated by a memory interface unit which may comprise a single, multi-ported interleaved data memory device or other suitable memory dedicated processor interconnecting the local memories with a host computer or other data source. In the alternative, each of the local memories may be physically distinct from one another and directly connected through a suitable processor control to a particular magnetic disk.

Figure 7:
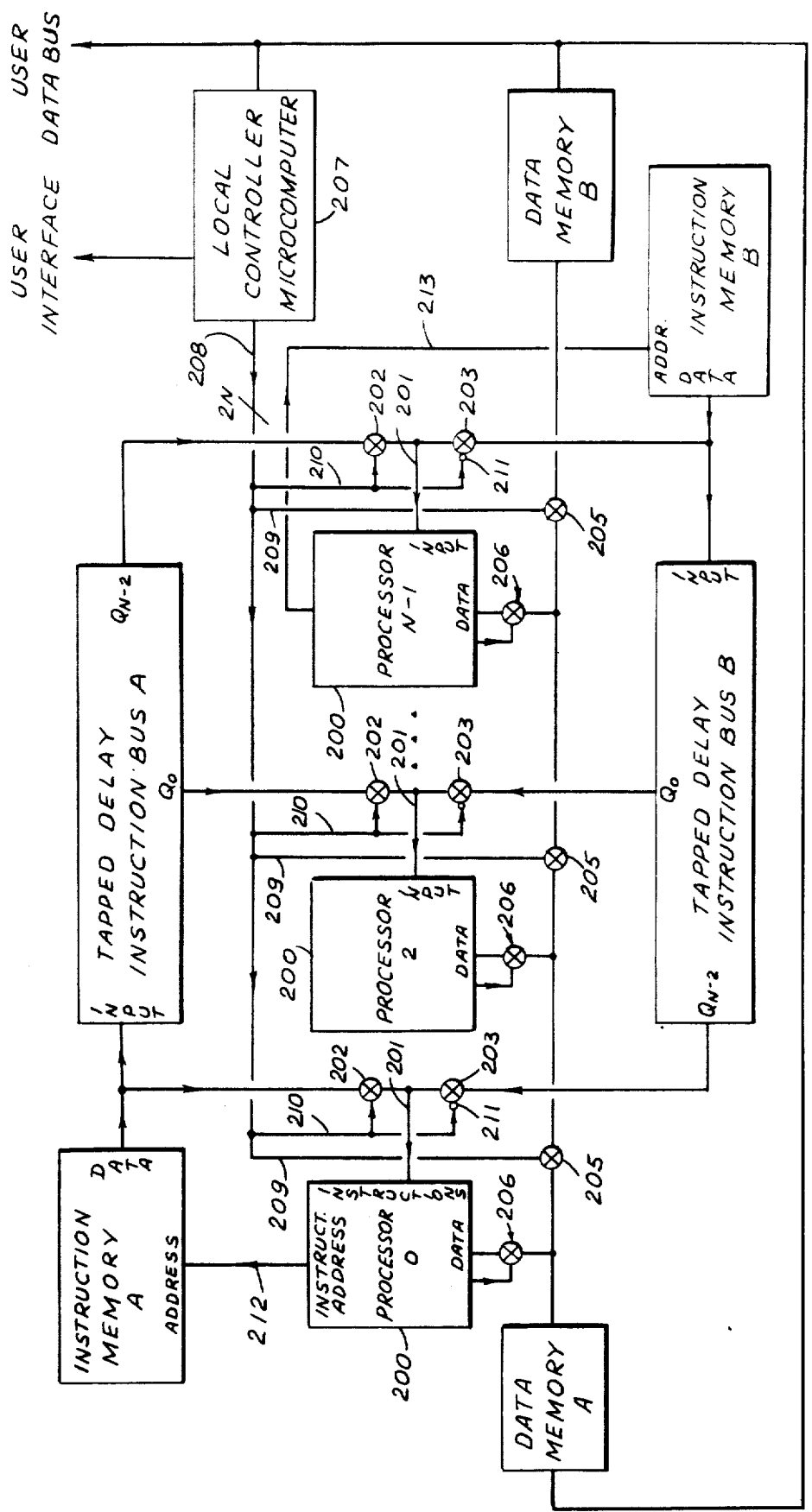
FIG. 7 is an illustration in block diagram form of the shared chain embodiment of the multiprocessor system of the present invention.

Further versatility in the operation of the time-skewed system of the invention is achieved by the shared linear chain embodiment illustrated in FIG. 7. Each of the microprocessors 200 includes an instruction bus tap 201 which may be selectively connected via gates 202, 203 either to a dedicated tap Q of a tapped delay instruction bus A or a dedicated tap Q of a tapped delay instruction bus B. The tapped delay instruction buses A, B are each operable in accordance with the time-skewed instruction flow teaching of the invention and are each connected to a complementary instruction memory A, B. In this manner, each of the processors may be arranged to operate in accordance with either of two sets of instructions, as stored in the instruction memories A, B. Moreover, a common data bus 204 is provided with a series of selectively controlled gates 205. All but one of the gates 205 will be closed, with the single selectively controlled open gate 205 acting to divide the common data bus 204 into two segments. As illustrated, the left hand end of the common data bus 204 is connected to a data memory A, and the right hand end of the common data bus 204 is connected to a second data memory B. The open gate 205 will isolate the two data memories A, B from one another, while the remaining closed gates 205 will facilitate data flow from data memory A to all of the microprocessors 200 situated to the left of the selected open gate 205, as well as data flow from memory B to all of the microprocessors 200 situated to the right of the open gate 205. Of course, each of the microprocessors 200 is provided with a gate controlled data bus tap 206 of the type described above with respect to FIGS. 6 and 6A to selectively connect the particular microprocessor 200 to the common data bus 204 during the execution of data bus access instructions.

Accordingly, the double memory, double tapped delay line configuration enables a linear chain of microprocessors 200 to be divided into two segments. Thus, in the event that there are two sets of data which must be processed pursuant to two different sets of instructions and each data processing operation may be efficiently performed on a number of microprocessors less than the total number of microprocessors in the chain, e.g., half the number of microprocessors, then the system of FIG. 7 may be selectively configured to simultaneously process each of the data operations. To that end, a local controller microcomputer 207 may be programmed via a suitable user interface component (not specifically illustrated) to selectively operate the gates 202, 203, 205 so as to divide the chain. The local controller microcomputer 207 includes a bus 208 consisting of 2n lines to interconnect various pins of I/O ports of the microcomputer 207 to the individual gates 202, 203, 205. Two lines 209, 210 of the bus 208 are dedicated to each microprocessor 200 whereby one of the dedicated lines 209 is connected to the control terminal of the gate 205 adjacent the microprocessor 200 and the other dedicated line 210 is connected to the control terminal of the gate 202 and through an inverter 211 to the control terminal of the gate 203 of the gates 202, 203 associated with the instruction bus tap 201 servicing the particular microprocessor 200. In this manner, the controller microcomputer 207 may operate the gates 202, 203, 205 to divide the chain by opening the particular gate 205 situated between the two pre-selected segments of microprocessors 200 of the divided chain, closing all of the gates 202 associated with the microprocessors 200 situated to the left of the open gate 205 to thereby connect each of such left-side microprocessors 200 to the tapped delay instruction bus A and opening all of the gates 202 associated with the microprocessors 200 situated to the right of the open gate 205 to thereby isolate each of such right-side microprocessor 200 from the instruction bus A. Of course, the inverter 211 will operate to set the gates 203 in a state opposite to the state of the complementary gates 202 whereby all of the gates 203 associated with the left-side microprocessors 200 will be open to isolate the left-side microprocessors 200 from the tapped delay instruction bus B and all of the gates 203 associated with the right-side microprocessors 200 will be closed to connect the right-side microprocessors 200 to the tapped delay instruction bus B.

Pursuant to the preferred embodiment of the invention, each of the first and last microprocessors 200 include a direct instruction access bus 212, 213 so that these microprocessors 200 may access the instructions from the respective instruction memory A, B for transmission through the complementary tapped delay instruction bus A, B. Of course, it should be understood that the first microprocessor 200 will always be the first microprocessor of the left-hand segment of the divided chain and the last microprocessor will always be the first microprocessor of the right-hand segment of the divided chain. If the linear chain is to be operated in an undivided manner, the rightmost gate 205 is opened to completely isolate data memory B from the microprocessors 200 and the gates 202, 203 are operated whereby all of the microprocessors 200 are connected through to their corresponding taps to tapped delay instruction bus A.

Figure 5:
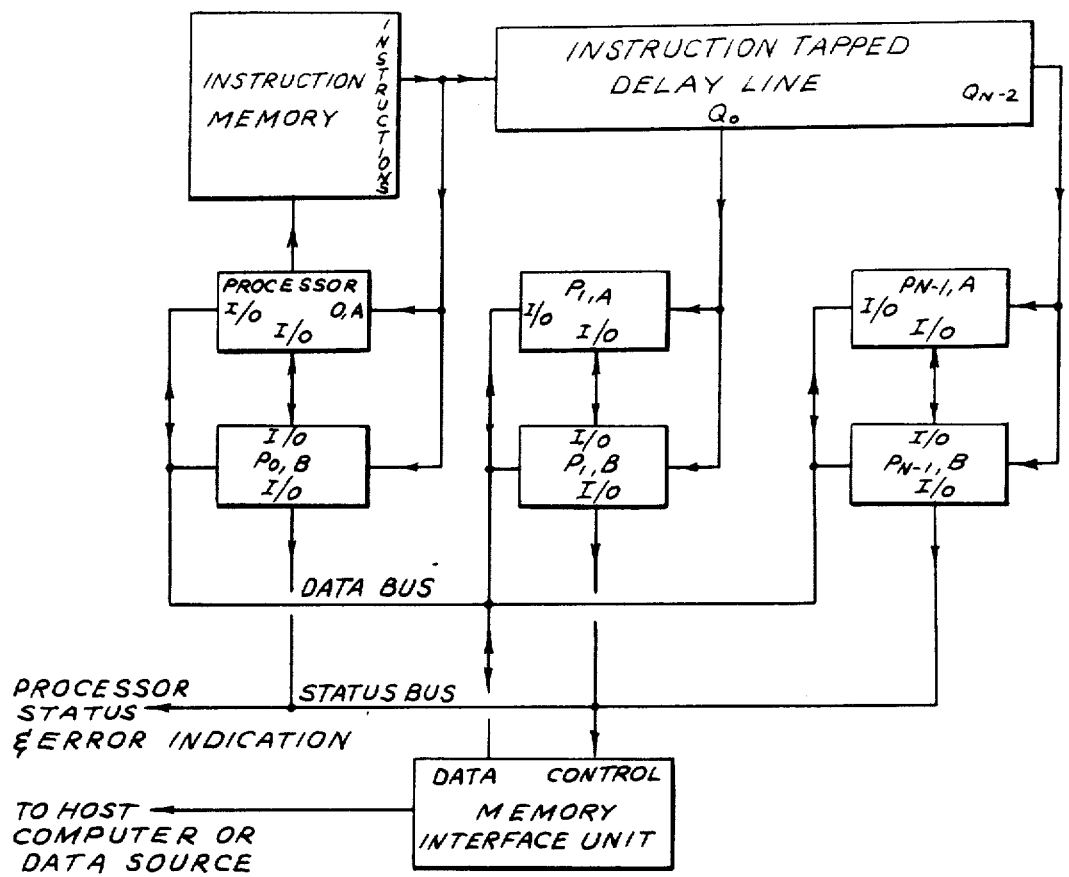
FIG. 5 is an illustration in block diagram form of a fault tolerant configuration for a multiprocessor system incorporating the teachings of the present invention.

Increased reliability and accuracy in the operation of the system according to the invention may be achieved by implementing a fault-tolerant embodiment of the invention, as illustrated in FIG. 5. In this embodiment, each of the microprocessor segments 10' of the linear chain comprises two microprocessors, e.g., $P_{O,A}$, $P_{O,B}$ to $P_{N-1, A}$, $P_{N-1, B}$. Each of the dual microprocessor segments 10' includes a common data bus access bus 300 to interconnect both of the microprocessors of the segment 10' to the common data bus 304, as well as a common tap 301 interconnecting both microprocessors of the particular segment 10' to one of the taps Q of the instruction tapped delay line 302. Therefore, the flow of instructions and data to each of the two processors of each segment 10' will be identical whereby both processors operate on the identical data parcel pursuant to the same set of instructions. Both of the processors of each segment 10' are interconnected with one another by a bus 305, whereby the processors of the segment 10' may be programmed to compare the output data calculated by each of the microprocessors of the segment 10'. An identical match will indicate proper operation of both microprocessors of the segment 10' whereas a mismatch will indicate improper functioning among the two microprocessors. Information relating to improper functioning may be transmitted by one of the pair of microprocessors to a status bus 303 which may be connected to a suitable indicator means (not specifically illustrated) to indicate to the user or other automatic means a malfunctioning segment 10'.

Figure 8:
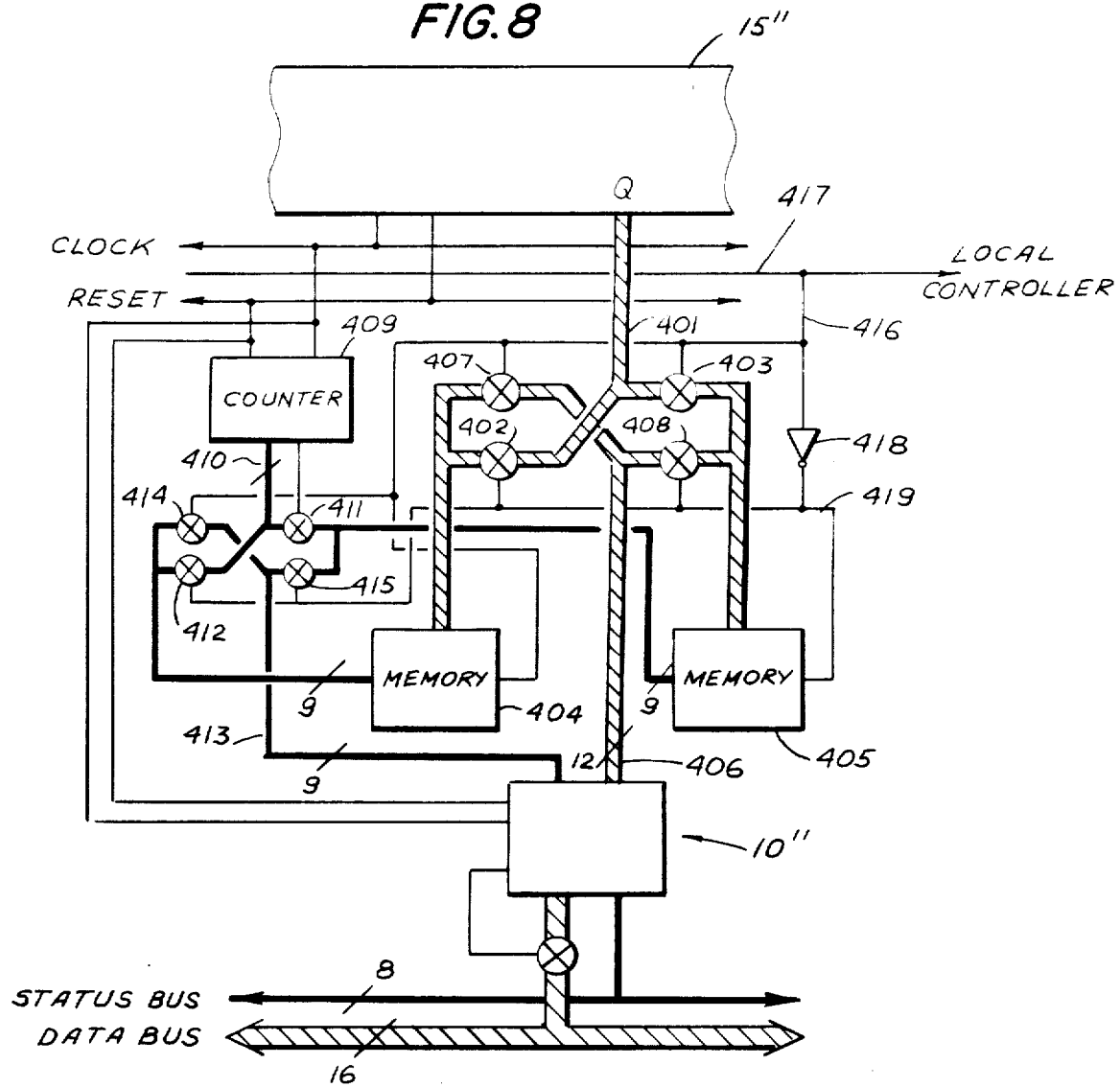
FIG. 8 is an illustration in block diagram form of a double buffered instruction interconnect arrangement between one of the microcomputers of the multiprocessor system of the present invention and the particular microcomputer's tap of the tapped delay line.
Figure 9:
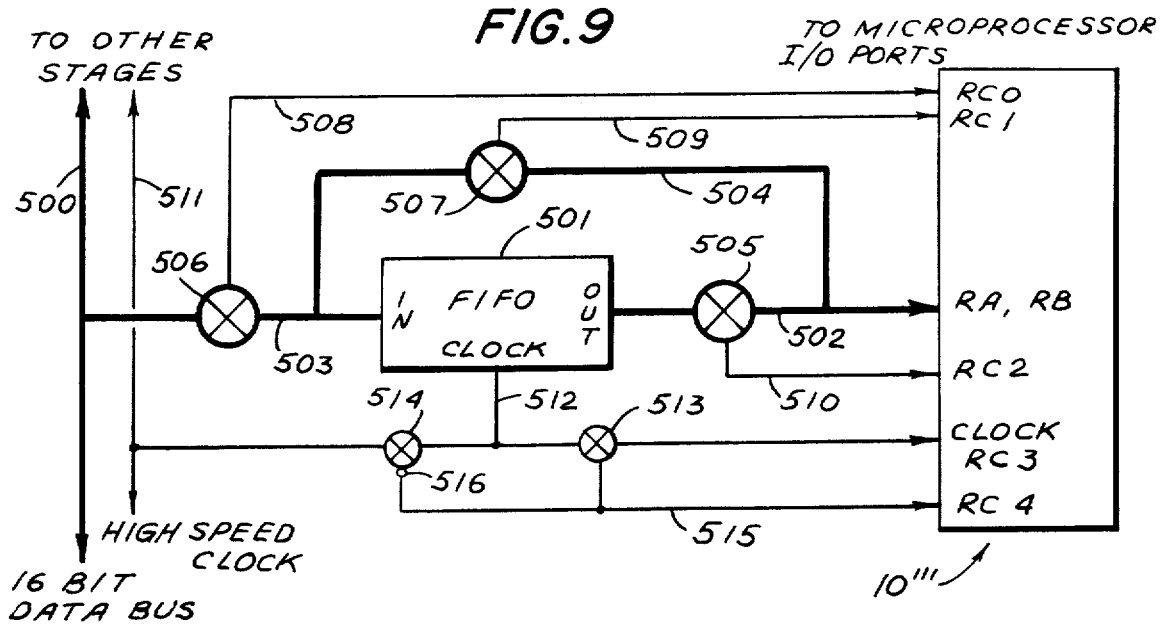
FIG. 9 is an illustration in block diagram form of a data buffer arrangement associated with each of the microcomputers of the multiprocessor system of the present invention.

The speed and versatility of operation of the system may be enhanced by utilizing various modified connection systems between each of the microprocessors of the linear chain and either the instruction tapped delay line or the common data bus, as illustrated in FIGS. 8 and 9. Referring initially to FIG. 8, there is illustrated a double buffered instruction interconnect arrangement between a representative microprocessor 10" of the linear chain and the instruction tapped delay line 15". The tap bus 401 interconnects via gates 402, 403 the tapped delay line 15" with I/O ports of two memory means 404, 405. The microprocessor 10" is also connected to the same I/O ports of the memory means 404, 405 through bus 406 and gates 407, 408. As the instructions of the common set of instructions ripple down the taps of the tapped delay line 15" to the tap connected to the microprocessor 10", the instructions will flow through the instruction bus 401 and into one or the other of the memory means 404, 405 depending upon the open/close state of the gates 402, 403 until the set of instructions is stored therein. Thereafter, a second set of instructions may be applied to the instruction tapped delay line 15" for transmission through bus 401 to the other of the memory means 404, 405 for storage. During the time the second set of instructions is being applied to said other memory means 404, 405, the microprocessor 10" may be connected through the bus 406 to the first used memory means 404, 405 to access and apply the set of instructions already stored therein. This arrangement will greatly improve the versatility of the microprocessor 10", inasmuch as the microprocessor will now have unrestricted access to the entire set of instructions to be applied by the microprocessor 10".

A counter 409 is provided as an addressing means for the instructions being inputted into one or the other of the memory means 404, 405. The digital output of the counter 409 is applied via bus 410 and gates 411, 412 to either the memory 404 or the memory 405, depending upon the open/close state of the gates 411, 412. Moreover, the microprocessor 10" is provided with an address bus 413 which is connected via gates 414, 415 to the memories 404, 405. As should be understood, the interconnect arrangement between the tapped delay line 15", the microprocessor 10", the memory means 404, 405 and the counter 409 at any one time depends upon the open/close states of the gates 402, 403, 407, 408, 411, 412, 414, 415. To that end, a gate control line 416 extends from a local controller line 417 to the control terminal of each of gates 403, 407, 411 and 414. The local controller line 417 may be connected to a controller microprocessor (not specifically illustrated) programmed to apply appropriate control signals to the line 417 to shift the open/close state of the gates 403, 407, 411 and 414 in accordance with the time necessary to load a complete set of instructions into one or the other of the memory means 404, 405.

An inverter 418 connects a line 419 to the line 416 whereby the negative of the control signal appearing on the line 416 will be applied by the line 419 to each of the gates 402, 408, 412 and 415. The inverter 418 arrangement will insure that each one of the paired gates 402, 403; 407, 408; 411, 412; and 414, 415; and 403, 408; 402, 407; 411, 415; and 412, 414 is always in an opposite state relative to the other gate of the pair, i.e., when one of the pair is in an open state, the other gate will be in a closed state. Accordingly, at any one time the instruction bus 401 will be connected to one and only one of the memory means 404, 405 and the microprocessor 10" will be connected to one and only to the other memory means 404, 405. Likewise, the above-described inverter arrangement will insure that the counter 409 will always be connected to the memory means 404, 405 that is receiving instructions for storage from the tapped delay line 15" and the address bus 413 of the microprocessor 10" will always be connected to the memory means 404, 405 connected to the microprocessor 10" by the bus 406 and closed gate 407, 408. Thus, the controller 409 may assign a pre-selected address sequence to the instructions being stored in one of the memory means 404, 405 based upon the time cycle operation of the time-skewed system. Thereafter, the microprocessor 10", under suitable software control, may access the instructions for execution through its address bus 413.

The double buffered arrangement of FIG. 8 greatly improves the flexibility of operation of each microprocessor through the ready access by the microprocessor to the complete set of instructions. Thus, the software which may be implemented on the system may include loops and references to other instructions, inasmuch as the microprocessor will have the ability to access any of the instructions stored in memory. This arrangement will therefore expand the complexity of operations which may be performed on the time-skewed system of the invention.

Similar advantages may be realized by the FIFO data buffer arrangement illustrated in FIG. 9. Each of the microprocessors 10''' is arranged to be interconnected with the common data bus 500 by a first-in-first-out memory buffer means (FIFO) 501. To that end, two I/O ports designated RA and RB of the microprocessor 10''' are connected by a bus 502 to the output end of the FIFO 501. A second bus 503 connects the input port of the FIFO 501 to the common data bus 500. In addition, a bus 504 forms a loop from the input to the output of the FIFO 501. Each of the buses 502, 503, 504 is provided with a gate 505, 506, 507, respectively, whereby the buses 502, 503, 504 may be selectively opened or closed to data flow. Several I/O terminals RC0, RC1, RC2 of the microprocessor 10''' are provided with control lines 508, 509, 510 connected to the control terminals of the gates 505, 506, 507 such that the microprocessor 10''' may be programmed to selectively control the open/close states of the gates 505, 506, 507. Moreover, the system includes a high speed clock (not specifically illustrated), the output of which is connected to a line 511. The FIFO may be selectively connected to either the regular clock of the system via a terminal RC3 of the microprocessor 10''' or the high speed clock by virtue of line 512 and gates 513, 514. A terminal RC4 of the microprocessor 10''' is arranged via a control line 515 and inverter 516 to enable the microprocessor 10''' to selectively control the open/close states of the gates 513, 514.

Figure 10:
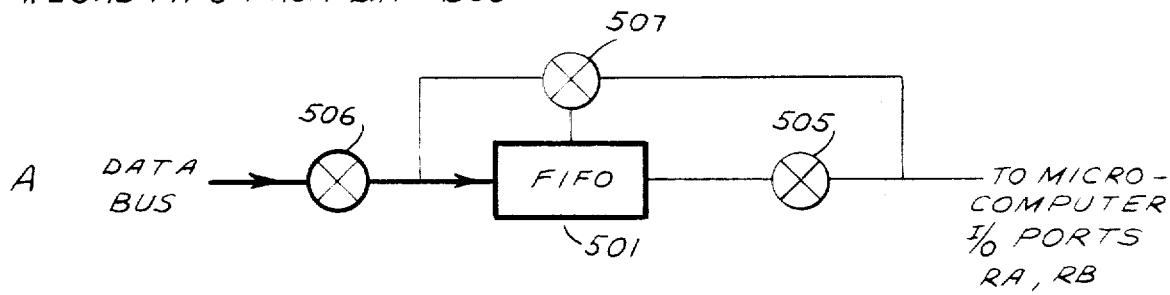
FIGS. 10A, 10B, 10C, 10D and 10E illustrate various data routing paths for the buffer arrangement illustrated in FIG. 9.
Figure 10:
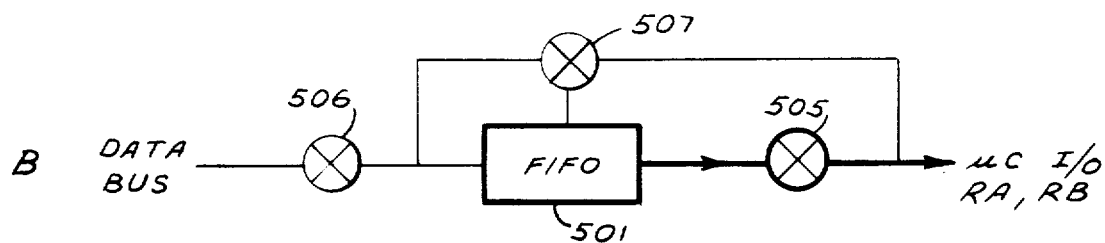
Figure 10:
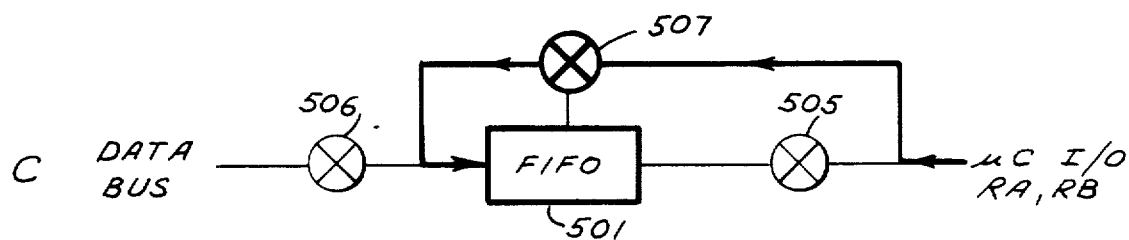
Figure 10:
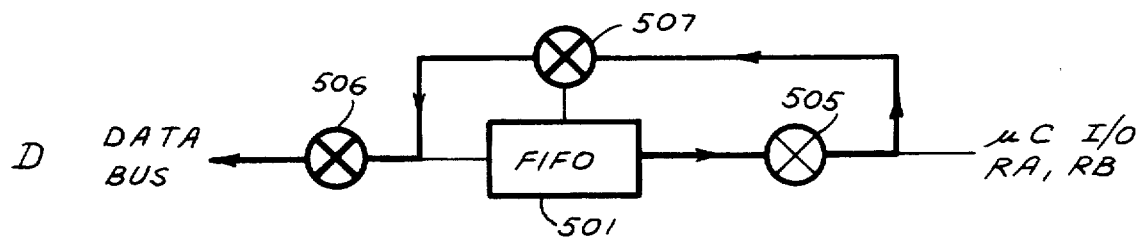
Figure 10:
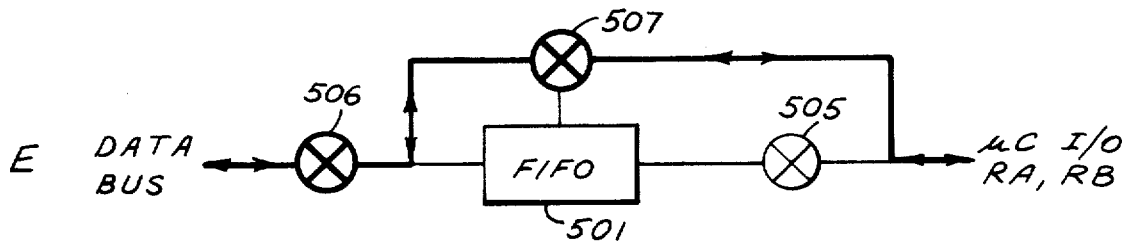

In the operation of the FIFO arrangement of FIG. 9, the microprocessor 10''' may be operated to provide various configurations of the open/close states of the gates 505, 506, 507 to thereby establish various data routing paths relative to the common data bus 500, FIFO 501, and the microprocessor 10'''. Referring to FIG. 10A, there is illustrated a routing path whereby data may flow from the common data bus 500 to the input of the FIFO. In the data routing path of FIG. 10A, the gate 506 is closed and the gates 505, 507 are opened. Moreover, the terminal RC4 of the microprocessor 10''' will control the gates 513, 514 whereby the gate 514 is closed and the gate 513 is opened. In this manner, the FIFO will be connected to the high speed clock whereby operation of the FIFO in the routing path configuration illustrated in FIG. 10A will be controlled by the high speed clock so that data flow from the common data bus 500 to the input of the FIFO 501 may be accomplished in a high speed operation to accelerate the overall data flow through the common data bus 500 and into the various microprocessors 10'''.

After all the information of a data parcel or several data parcels is stored in the FIFO 501, the gates 505, 506, 507 are controlled whereby the gate 505 is closed and the gates 506, 507 are opened (see FIG. 10B). In this configuration, the output of the FIFO 501 is connected to the I/O ports RA, RB of the microprocessor 10''' whereby the microprocessor 10''' now has access to the data stored in the FIFO 501 for processing pursuant to the common set of instructions being applied to the microprocessor 10''' through the tapped delay line. In the data routing configuration illustrated in FIG. 10B, the microprocessor 10''' will control the gates 513, 514 through line 514 whereby the gate 513 is closed and the gate 514 is opened. This will connect the FIFO 501 to the terminal RC3 of the microprocessor 10''' whereby the FIFO will now operate pursuant to the time control of the regular system clock.

After the microprocessor 10''' has performed its data processing operation on the parcel(s) of data accessed from the FIFO 501, the gate 507 is closed and the gates 505, 506 are opened (see FIG. 10C) whereby the output data parcel may be transmitted through I/O ports RA, RB from the microprocessor 10''' to the input of the FIFO 501 for later transmission to the common data bus, as will appear.

Referring now to FIG. 10D, each of the gates 505, 506, 507 are closed whereby the data output parcel now stored in the FIFO may flow from the FIFO output to the data bus through the loop bus 504. Once again, in the data routing configuration of FIG. 10D, the gates 513, 514 are controlled whereby the FIFO 501 is once again operating pursuant to the high speed clock during the flow of output data from the FIFO to the common data bus 500. Thus, the various data routing paths illustrated in FIGS. 10A through 10D may be provided in sequence whereby high speed data transfer may be implemented between the common data bus 500 and the FIFO 501 and regular speed operation may be followed as the microprocessor 10''' operates to process the data stored in the FIFO 501. As should be understood, the FIFO 501 acts as an intermediate storage means for both the input and output data parcels whereby the data buffer effect of the FIFO 501 permits high speed operation of data transfers to and from the common data bus 500 while permitting operation pursuant to the regular system clock by the microprocessor 10'''. Of course, the gates 505, 506, 507 may be operated whereby the FIFO 501 is by-passed and the microprocessor I/O ports RA, RB are connected directly to the common data bus 500. To that end, as illustrated in FIG. 10E, the gate 505 is opened and the gates 506, 507 are closed.

Thus, the present invention provides a highly versatile system architecture whereby a large amount of data may be processed by a plurality of microprocessors to achieve significant throughput rate speed-ups. The time-skewed instruction bus and common data bus arrangements taught by the present invention provide a means whereby instruction and data flow to the plurality of microprocessors is achieved without interprocessor conflicts and in a manner to obtain highly concurrent operation of the various microprocessors. As discussed above, in practical applications where there is a large amount of data points to be processed, e.g., 1,000,000 data points, the throughput rate of the system approaches the ideal relationship of the number of processors times the processing rate of the individual, identical microprocessors. The system of the invention offers additional advantages in that the system may be constructed entirely from commercially available subcomponents. Moreover, there are significant practical applications to which the system of the invention may be applied to achieve economical high speed data processing.

For example, the system of the invention may be applied to a quality control system to effect a high speed comparison of a production part relative to one or more standard reference parts. In such an application, the memory means is provided with an interface with a controller microcomputer, a T.V. camera, and a frame grabber. The T.V. camera may be focused upon one or more standard reference parts and the video image thereof transformed into an array of digital information by the frame grabber. The controller microprocessor will operate to place the standard reference part digital information into the memory means. Thereafter, the T.V. camera may be focused upon a series of production parts and the frame grabber will provide digital information corresponding to each of the production parts. The total data placed in the memory means by the controller microcomputer will therefore contain digital information on the standard reference parts and the production parts. This information may then be fed to the common data bus and be processed pursuant to a set of instructions wherein the digital information on each particular production part is compared to the digital information representing the standard reference parts. The above-described application may involve a common set of instructions of 50 to 1,000 separate instructions and the total number of data points representing the production and standard parts may well be in excess of 1,000,000 data points. Other similar practical applications exist in the areas of graphics and image-processing, and computer-aided design systems. The time-skewed instruction bus teaching of the present invention when coupled with the common data bus feature as well as the various microprocessor configurations and enhancement features provides the art with a highly versatile and efficient multiprocessor computer system.

It should be understood, of course, that the illustrated forms of the invention disclosed herein are intended to be representative only, as certain changes may be made therein by those skilled in the art without departing from the clear teachings of the disclosure. Accordingly, reference should be made to the following appended claims in determining the full scope of the invention.

I claim:

1. A multiprocessor data processing system, which comprises
  (a) a plurality of microprocessor units,
  (b) an instruction memory device electrically storing a common set of instructions in a pre-ordered sequence, each of said instructions being stored in representative digital electrical signal form,
  (c) said instruction memory device including an output port,
  (d) first electrical control means being associated with said instruction memory device and operable to control said instruction memory device whereby the digital electrical signals representative of each of said instructions are applied to said output port, pursuant to the pre-ordered sequence, one at a time, in a timed sequence,
  (e) a tapped delay line instruction bus means having an input port electrically connected to the output port of said instruction memory device and including a plurality of individual tap buses,
  (f) said tapped delay line instruction bus means including second electrical control means operable to control the digital electrical signals representative of said instructions applied to the input port in said pre-ordered, timed sequence whereby the digital electrical signals for each of said pre-ordered instructions are applied to each of said individual tap buses, one tap bus at a time, pursuant to said pre-ordered sequence, in a timed, time-skewed sequence synchronized with said first-mentioned time sequence, (g) each of said plurality of microprocessor units being electrically connected to one of said individual tap buses, whereby each of said microprocessor unit receives the representative electrical signals for each of the instructions pursuant to said pre-ordered, time sequences.

2. The multiprocessor data processing system according to claim 1, further characterized by (a) said plurality of microprocessor units being arranged in a first linear array, (b) said plurality of tap buses arranged in a second linear array whereby each tap bus of the second linear array is electrically connected to a complementary microprocessor unit of said first linear array, (c) said second electrical control means being operable to control the digital electrical signals representative of said instructions whereby the digital electrical signals for each of said instructions are applied to each of said tap buses in said second linear array, one at a time, in said timed, time-skewed sequence whereby the pre-ordered, timed sequence of instructions proceeds in a controlled manner, from tap bus to adjacent tap bus of the second linear array.

3. The multiprocessor data processing system according to claim 2, further characterized by (a) said second electrical control means of the tapped delay line instruction bus means comprising a plurality of D flip/flop devices arranged in a third linear array, (b) the output of each of said D flip/flop devices being electrically connected to the input of the next adjacent D flip/flop device in said third linear array and to a complementary tap bus of said second linear array, (c) a clock line, (d) each of said D flip/flop devices being electrically connected to said clock line.

4. The multiprocessor data processing system according to claim 1, further characterized by (a) a common data bus means, (b) each of said microprocessor units being electrically connected to said common data bus means, (c) data memory means connected to said common data bus means, and (d) third electrical control means being associated with said data memory means and operable to control said data memory means whereby said memory means will apply discrete data parcels to said common data bus in a controlled, timed sequence.

5. The multiprocessor data processing system according to claim 4, further characterized by (a) each of said microprocessor units including a selectively controlled gate means selectively electrically interconnecting said microprocessor unit with said common data bus.

6. The multiprocessor data processing system according to claim 4, further characterized by (a) each of said microprocessor units including a first-in-first-out data memory means associated therewith, (b) first, second and third gated bus means associated with said common data bus, said first-in-first-out memory means and said microprocessor unit whereby said first gated bus means electrically interconnects said common data bus to an input port of said first-in-first-out memory means, said second gated bus means electrically interconnects an output port of said first-in-first-out memory means to I/O ports of said microprocessor unit and said third gated bus means electrically interconnects said first and second gated bus means to one another, (c) fourth electrical control means associated with said microprocessor unit and operable to selectively control said first, second and third gated bus means.

7. The multiprocessor data processing system according to claim 6, further characterized by (a) a high speed clock line associated with said first-in-first-out memory means, (b) gated line means interconnecting said high speed clock line, to said first-in-first-out memory means, (c) fifth electrical control means operable to selectively control said gated line means whereby said first-in-first-out memory means may be selectively connected to said high speed clock line.

8. The multiprocessor data processing system according to claim 4, further characterized by (a) each of said microprocessor units comprising a pair of individual microprocessor devices, (b) said microprocessor devices of each of said microprocessor units being electrically connected to one another, (c) at least one of said microprocessor devices of each microprocessor unit being operable to compare data output generated by said at least one microprocessor device to the data output generated by the other microprocessor device.

9. The multiprocessor data processing system according to claim 1, further characterized by (a) at least two local instruction memory means associated with each of said microprocessor units, (b) each of said at least two local instruction memory means having:

(i) a first gated bus means being associated with said microprocessor unit and electrically interconnecting said associated microprocessor unit with each of said two local instruction memory means, (ii) a second gated bus means being associated with said individual tap bus and electrically interconnecting said associated tap bus with each of said two associated local instruction memory means, and (iii) third electrical control means associated with each of said first and second gated bus means and operable to control said first and second gated bus means whereby said tap bus is connected to one and only one of said two associated local instruction memory means at any one time, and said microprocessor unit is connected to and only to the other of said two associated local instruction memory means.

10. The multiprocessor data processing system according to claim 9, further characterized by (a) an instruction addressing means associated with each of said at least two local instruction memory means, (b) third gated bus means interconnecting said addressing means to each one of said two memory means, (c) said third electrical control means being operable to control said third gated bus means to selectively connect said addressing means to and only to the one of said memory means connected to said tap bus.

11. The multiprocessor data processing system according to claim 1, further characterized by (a) said plurality of microprocessor units being arranged in a rectangular array consisting of a first predetermined number of linear arrays arranged in parallel relative to one another, each of said linear array including a second predetermined number of microprocessor units, (b) a plurality of common data buses, (c) each of said plurality of common data buses being electrically connected to each microprocessor unit of a pre-selected linear array, (d) each one of said plurality of individual tap buses of said tapped delay line instruction bus means being electrically connected to one pre-selected microprocessor unit of each of the several linear arrays.

12. The multiprocessor data processing system according to claim 1, further characterized by (a) a second instruction memory device electrically storing a second common set of instructions in a pre-ordered sequence, each of said second instructions being stored in representative digital electrical signal form, (b) said second instruction memory device including an output port, (c) third electrical control means being associated with said second instruction memory device and operable to control said second instruction memory device whereby the digital electrical signals representative of each of said second instructions are applied to said output port, pursuant to the pre-ordered sequence, one at a time, in a timed sequence, (d) a second tapped delay line instruction bus means having an input port electrically connected to the output port of said second instruction memory device and including a plurality of individual tap buses, (e) said second tapped delay line instruction bus means including fourth electrical control means operable to control the digital electrical signals representative of said second instructions applied to the input port in said pre-ordered, timed sequence whereby the digital electrode signals for each of said second pre-ordered instructions are applied to each of said individual tap buses, one tap bus at a time, pursuant to said pre-ordered sequence, in a timed, time-skewed sequence synchronized with said first-mentioned timed sequence, (f) each of said plurality of microprocessor units including selectively controlled gate means electrically connecting said microprocessor unit to one of the individual tap buses of each of the tapped delay line instruction bus means and the second tapped delay line instruction bus means whereby said microprocessor unit may be selectively, electrically connected to one of said individual tap buses at a time, (g) fifth electrical control means being operative to selectively control said controlled gate means whereby said plurality of microprocessor units may be selectively divided into two groups of microprocessor units with the microprocessor units of one of said groups being connected to the tap buses of the tapped delay line instruction bus means and the microprocessor units of the other of said groups being connected to the tap buses of said second tapped delay line instruction bus means.

13. The multiprocessor data processing system according to claim 12, further characterized by (a) a common data bus means, (b) each of said microprocessor units being electrically connected to said common data bus means, (c) said common data bus means including first and second input ports, (d) a first data memory means electrically connected to said first input port, (e) a second data memory means electrically connected to said second input port, (f) said common data bus means including a plurality of normally closed, selectively controlled gate switch means, (g) sixth electrical control means being operable to selectively open one and only one of said gate switch means to divide said common data bus means into two segments with one of said segments being connected to one of said first and second data memory means and the other of said segments being connected to the other of said first and second data memory means.

* * * * *